(12) United States Patent
DiCarlo

(10) Patent No.: US 7,760,253 B2
(45) Date of Patent: Jul. 20, 2010

(54) IMAGING DEVICE ANALYSIS METHODS, IMAGING DEVICE ANALYSIS SYSTEMS, AND ARTICLES OF MANUFACTURE

(75) Inventor: Jeffrey M. DiCarlo, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1564 days.

(21) Appl. No.: 11/054,193

(22) Filed: Feb. 8, 2005

(65) Prior Publication Data
US 2006/0175531 A1 Aug. 10, 2006

(51) Int. Cl.
*H04N 3/14* (2006.01)
*H04N 9/73* (2006.01)

(52) U.S. Cl. .................................. 348/272; 348/223.1

(58) Field of Classification Search .............. 250/208.1, 250/226, 371; 348/223.1, 241, 271, 272, 348/273, 289
See application file for complete search history.

(56) References Cited

U.S. PATENT DOCUMENTS

| | | | |
|---|---|---|---|
| 5,371,690 A | 12/1994 | Engel et al. | |
| 5,579,106 A | 11/1996 | Kremer | |
| 5,631,979 A * | 5/1997 | Cok | 382/263 |
| 5,760,829 A * | 6/1998 | Sussmeier | 348/187 |
| 6,023,525 A * | 2/2000 | Cass | 382/162 |
| 6,125,223 A | 9/2000 | Drozdowicz | |
| 6,205,244 B1 | 3/2001 | Bawolek | |
| 6,211,911 B1 | 4/2001 | Komiya et al. | |
| 6,459,449 B1 * | 10/2002 | Juen | 348/223.1 |
| 6,538,242 B1 * | 3/2003 | Kuno et al. | 250/208.1 |
| 6,597,451 B1 | 7/2003 | Araki | |
| 6,639,574 B2 | 10/2003 | Scheibe | |
| 6,655,778 B2 | 12/2003 | Arquilevich et al. | |
| 6,839,088 B2 | 1/2005 | DiCarlo et al. | |
| 6,864,916 B1 | 3/2005 | Nayar et al. | |
| 7,006,690 B1 * | 2/2006 | Imura | 382/167 |
| 7,012,634 B2 * | 3/2006 | Vogel et al. | 348/187 |
| 7,016,533 B1 | 3/2006 | Bawolek et al. | |

(Continued)

FOREIGN PATENT DOCUMENTS

EP 0990881 A 4/2000

(Continued)

OTHER PUBLICATIONS

"Melles Griot—Glossary"; "Pincushion Distortion"; www.mellesgriot.com/glossary/wordlist/glossarydetails.asp?wID=20188; Jan. 20, 2005; 1 pp.

(Continued)

*Primary Examiner*—Nhan T Tran
*Assistant Examiner*—Trung Diep

(57) ABSTRACT

Imaging device analysis methods, imaging device analysis systems, and articles of manufacture are described. According to one embodiment, an imaging device analysis method includes providing a plurality of first responsivity values corresponding to a first responsivity function of an imaging device, first determining that error associated with the first responsivity values is unacceptable, providing a plurality of second responsivity values corresponding to a second responsivity function of the imaging device responsive to the first determining, wherein the providing the second responsivity values comprises constraining the second responsivity values to comprise values of the same sign, second determining error associated with the second responsivity values, and selecting the second responsivity values responsive to the second determining yielding acceptable error.

38 Claims, 8 Drawing Sheets

U.S. PATENT DOCUMENTS

| | | |
|---|---|---|
| 7,075,643 B2 | 7/2006 | Holub et al. |
| 7,136,157 B2 | 11/2006 | Gomm et al. |
| 7,154,546 B1 * | 12/2006 | Cho .......................... 348/272 |
| 7,173,657 B2 * | 2/2007 | Katoh et al. ................ 348/273 |
| 7,236,195 B2 * | 6/2007 | Quan et al. ................. 382/167 |
| 7,286,166 B2 | 10/2007 | Smith |
| 2002/0018128 A1 * | 2/2002 | Katoh et al. ................ 348/223 |
| 2002/0159066 A1 | 10/2002 | Berstis |
| 2002/0171842 A1 | 11/2002 | DiCarlo et al. |
| 2003/0100998 A2 * | 5/2003 | Brunner et al. ............... 702/19 |
| 2003/0146663 A1 | 8/2003 | Nelson et al. |
| 2003/0185004 A1 | 10/2003 | Vogel et al. |
| 2003/0214259 A9 | 11/2003 | Dowling et al. |
| 2003/0223007 A1 | 12/2003 | Takane |
| 2004/0105264 A1 | 6/2004 | Spero |
| 2004/0239798 A1 | 12/2004 | Nayar et al. |
| 2005/0219364 A1 | 10/2005 | DiCarlo |

FOREIGN PATENT DOCUMENTS

| | | |
|---|---|---|
| EP | 1349432 A | 10/2003 |
| WO | WO 2005/101856 A1 | 10/2005 |

OTHER PUBLICATIONS

"Melles Griot—Glossary"; "Barrel Distortion"; www.mellesgriot.com/glossary/wordlist/glossarydetails.asp?wID=102; Jan. 20, 2005; 1 pp.

"About K-Series TV OPTOLINER Systems"; www.davidsonoptronics.com/tvon002.html; Mar. 26, 2002; 2 pp.

U.S. Appl. No. 10/818,622, filed Apr. 5, 2004; "Imaging Device Calibration Methods, Imaging Device Calibration Instruments, Imaging Devices, and Articles of Manufacture".

"Imaging Device Analysis Systems and Imaging Device Analysis Methods"; DiCarlo et al.; Filed Herewith.

"Imaging Device Analysis Systems and Imaging Device Analysis Methods"; Kholer et al.; Filed Herewith.

"Color Science"; "Concepts and Methods, Quantitative Data and Formulae,"; Wyszecki, G. et al.; John Wiley & Sons, Inc.; 1982; pp. 63-73.

"Cornerstone™ 260 1/4 m Motorized Monochromators"; http://www.newport.com/store/product.aspx?id=5385&Section=detail#; 1996; 1 pp.

PCT/US2005/010508; Filed Mar. 28, 2005; mailed Jul. 13, 2005; Search Report; 2 pp.

PCT/US2005/010508; Filed Mar. 28, 2005; mailed Jul. 13, 2005; Written Opinion; 6 pp.

* cited by examiner

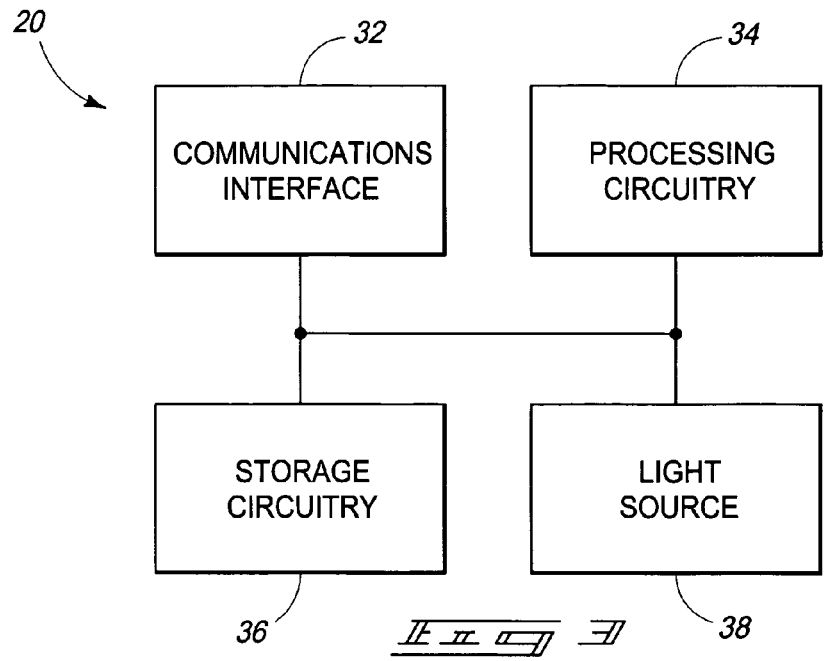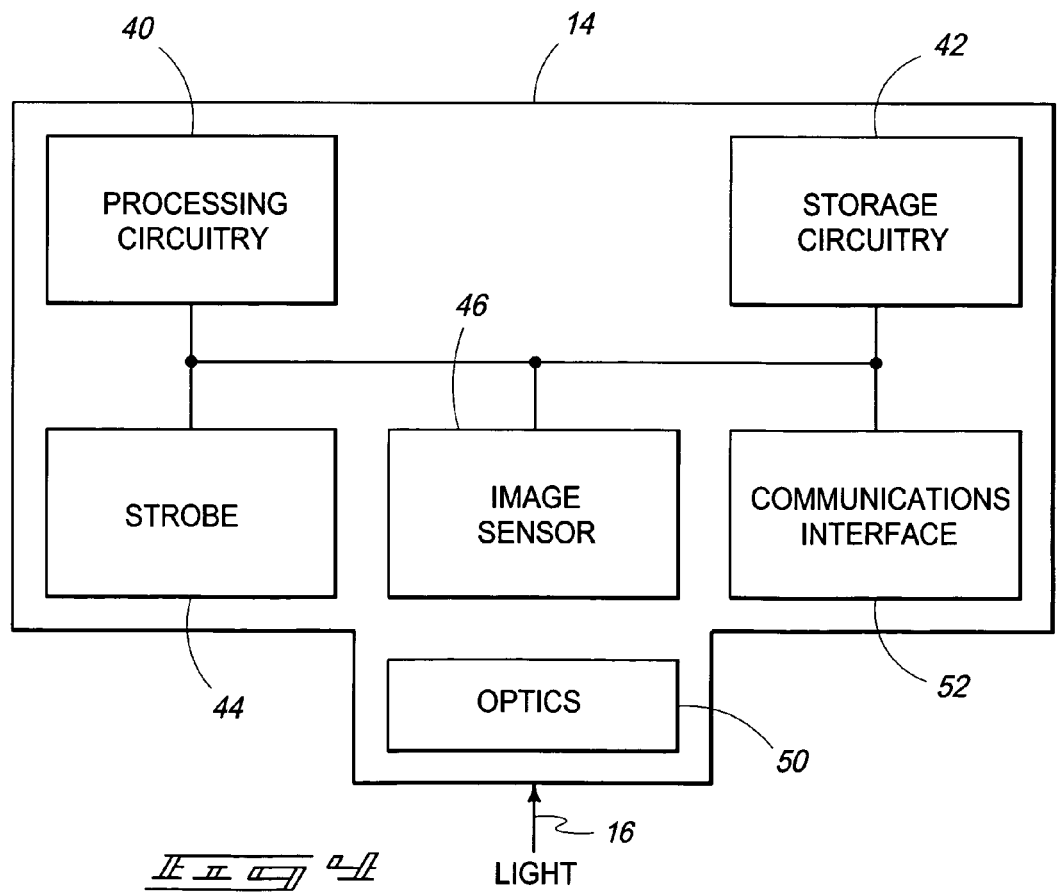

IMAGING DEVICE ANALYSIS METHODS, IMAGING DEVICE ANALYSIS SYSTEMS, AND ARTICLES OF MANUFACTURE

FIELD OF THE DISCLOSURE

Aspects of the disclosure relate to imaging device analysis methods, imaging device analysis systems, and articles of manufacture.

BACKGROUND OF THE DISCLOSURE

Imaging systems of various designs have been used extensively for generating images. Exemplary imaging systems include copiers, scanners, cameras, and more recently digital cameras, and other devices capable of generating images. Color imaging systems have also experienced significant improvements and are increasing in popularity. Color imaging systems may be calibrated to increase accuracy of various image processing algorithms (e.g., illuminant estimation, color correction, etc.), and also to increase the color accuracy of final reproductions.

For example, even identically configured imaging systems may vary from one another due to product tolerances or design variances. Referring to FIG. 1, a graphical representation of relative responsivity versus wavelength is shown for two hundred digital cameras corresponding to the same product. FIG. 1 illustrates the variations in blue, green, and red sensor responsivities of the sampled cameras represented by respective bands 4, 6 and 8. The illustrated bands have widths illustrating the size of the variations between respective cameras although the cameras structurally comprise the same components.

One color calibration technique uses reflective charts. Reflective charts can be utilized to calibrate a camera quickly and they are relatively inexpensive. However, calibrations implemented using reflective charts may not be accurate enough for utilization with cameras. Monochromators, on the other hand, can produce very accurate calibrations of color imaging systems including cameras. However, the calibration procedure with monochromators may take a relatively long period of time to complete, the devices are expensive, and accurate and controlled lighting is typically used.

Other analysis systems emit light of different wavelengths for use in performing analysis of an imaging device. The emitted light is captured by an imaging device in one or more images. Image data resulting from the captured images and information regarding the emitted light may be utilized to determine a responsivity function of the imaging device. However, some calculation techniques result in determination of a responsivity function including return of both positive as well as negative values (e.g., usage of the pseudoinverse of spectral data of a calibration chart and raw camera responses). The negatives values are typically clipped to zero which may introduce error into the calculated responsivity function of the imaging device with respect to the true responsivity of the imaging device.

At least some aspects of the disclosure are related to improved methods and systems for analyzing an imaging device.

SUMMARY

According to some aspects, exemplary imaging device analysis methods, imaging device analysis systems, and articles of manufacture are described.

According to one embodiment, an imaging device analysis method comprises providing a plurality of first responsivity values corresponding to a first responsivity function of an imaging device, first determining that error associated with the first responsivity values is unacceptable, providing a plurality of second responsivity values corresponding to a second responsivity function of the imaging device responsive to the first determining, wherein the providing the second responsivity values comprises constraining the second responsivity values to comprise values of the same sign, second determining error associated with the second responsivity values, and selecting the second responsivity values responsive to the second determining yielding acceptable error.

According to another embodiment, an imaging device analysis system comprises processing circuitry configured to generate a plurality of first responsivity values of the same sign corresponding to a first predictive responsivity function of an imaging device, to calculate a first error value using the first responsivity values and image data generated by the imaging device responsive to received light, to identify a plurality of second responsivity values of the same sign corresponding to a second predictive responsivity function of the imaging device responsive to the first error value being unacceptable, to calculate a second error value using the second responsivity values and the image data, and to select the second responsivity values and the second predictive responsivity function as the responsivity function for the imaging device responsive to the second error value being acceptable.

Other embodiments are described as is apparent from the following discussion.

DESCRIPTION OF THE DRAWINGS

FIG. 3 is a functional block diagram of an analysis device according to one embodiment.

FIG. 4 is a functional block diagram of an imaging device according to one embodiment.

DETAILED DESCRIPTION

At least some aspects of the disclosure provide methods and apparatus for analyzing an imaging device. As described below, exemplary aspects are directed towards determining a responsivity function indicative of responsivity of an imaging device being analyzed. Some aspects of the disclosure use spectral information of emitted light and raw camera responses to solve for camera responsivity functions via a non-linear equation with linear constraints according to an exemplary embodiment. In one embodiment, a plurality of responsivity values are identified and selected as the responsivity function of the imaging device. For imaging devices comprising a plurality of channels, the selected responsivity values may correspond to plural responsivity functions for the respective channels of the imaging device. The responsivity values of the selected responsivity function may be constrained to comprise values of the same sign which may reduce or minimize error with respect to representing the responsivity of the imaging device according to one embodiment. The values of the same sign comprise non-negative values (including zero) in at least one embodiment. Exemplary aspects of the disclosure may provide generation of responsivity functions for imaging devices which have increased accuracy compared with calculation methods which do not constrain the responsivity values.

Figure 1:
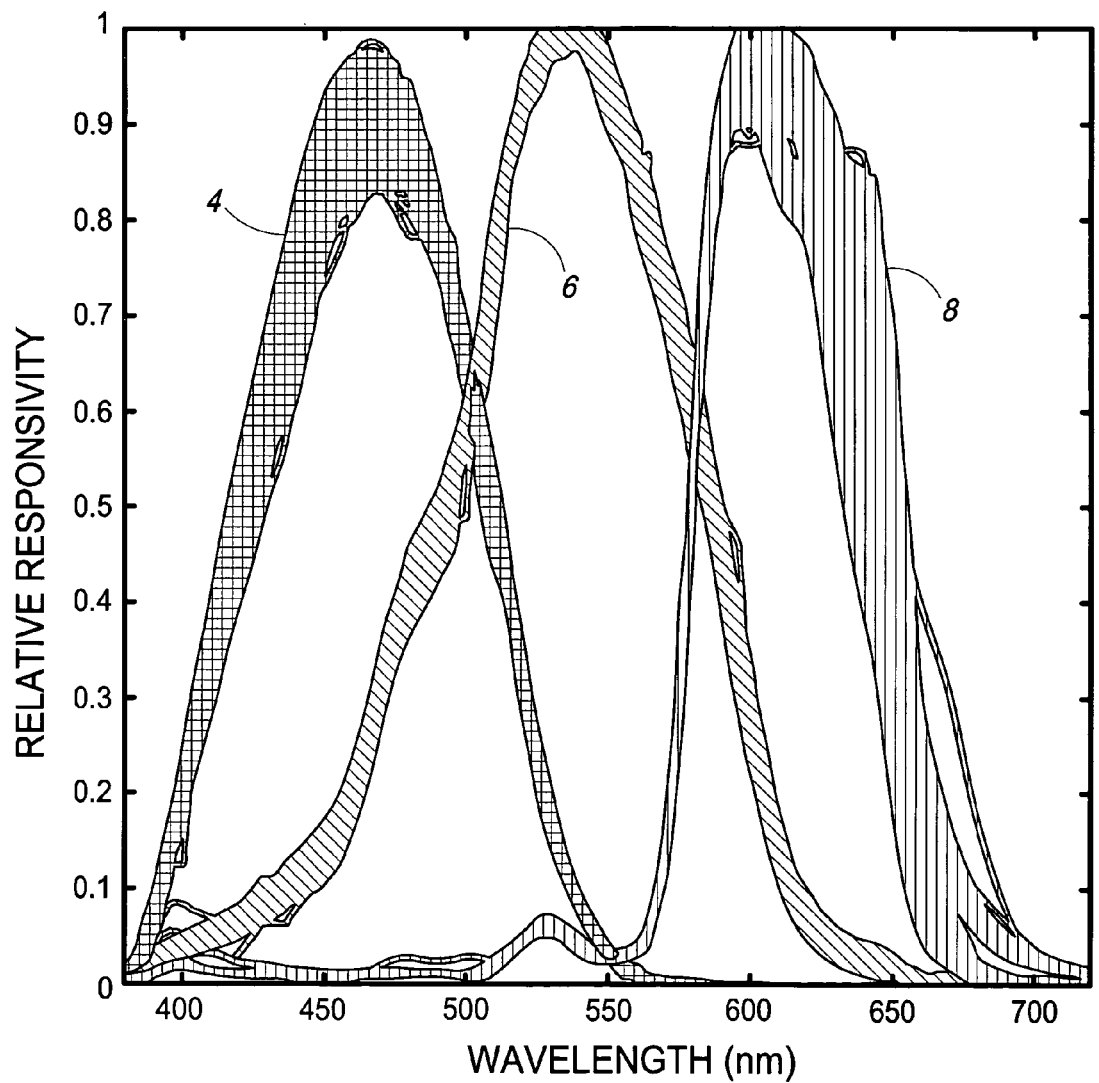
FIG. 1 is graphical representation of responsivity of a sampling of imaging systems.
Figure 2:
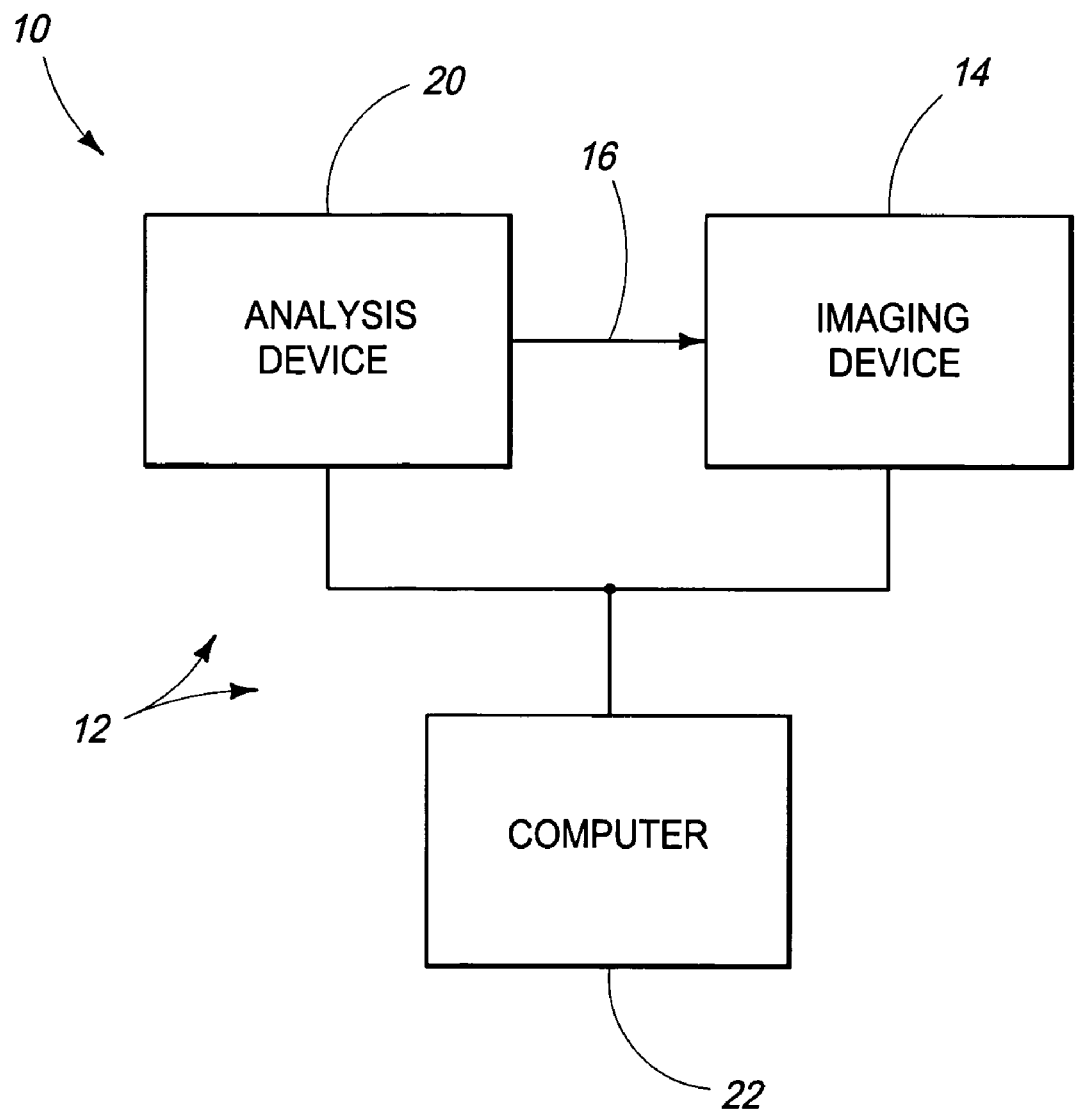
FIG. 2 is a functional block diagram of an exemplary imaging system according to one embodiment.

Referring to FIG. 2, an embodiment of an imaging system 10 is illustrated according to one embodiment. The imaging system 10 includes an imaging device analysis system 12 and an imaging device 14. The illustrated analysis system 12 includes an analysis device 20 and a computer 22 in one embodiment. In some embodiments, analysis device 20 is configured to emit light 16 which may be captured by imaging device 14 in the form of digital information or on a substrate, such as film.

Imaging device 14 may comprise a camera, digital camera, scanner, copier, multiple function peripheral or other configuration capable of capturing images and generating images. In some embodiments, imaging device 14 may comprise a color device capable of capturing color information of images and/or generating digital data indicative of the captured images.

In some embodiments, analysis system 12 is configured to analyze imaging device 14. In one exemplary embodiment, analysis system 12 is configured to determine one or more responsivity functions of imaging device 14 corresponding to the number of channels of the device in one embodiment. The determination of the responsivity functions may be performed at moments in time when the imaging device 14 is manufactured prior to sale, after sale for recalibration, or at other moments in time. The determined responsivity functions may be communicated to imaging device 14 if the responsivity functions are calculated externally of imaging device 14. Imaging device 14 may utilize the responsivity functions to implement imaging operations in at least one arrangement. Exemplary configurations and operational aspects of analysis system 12 and imaging device 14 according to illustrative embodiments are described below with respect to FIG. 3 and FIG. 4, respectively. Additional details of some embodiments are disclosed in co-pending U.S. patent application Ser. No. 10/818,622, filed on Apr. 5, 2004, entitled "Imaging Device Calibration Methods, Imaging Device Calibration Instruments, Imaging Devices, And Articles Of Manufacture", listing Jeffrey M. DiCarlo as inventor, having; a U.S. patent application entitled "Imaging Device Analysis Systems And Imaging Device Analysis Methods", listing Steven W. Trovinger, Glen Eric Montgomery, and Jeffrey M. DiCarlo as inventors, having; and a U.S. patent application entitled "Imaging Device Analysis Systems And Imaging Device Analysis Methods", listing Timothy L. Kohler, Casey Miller, Jeffrey M. DiCarlo, Steven D. Stoecker, and Les Paul Gehman as inventors, having; and the teachings of all of which are incorporated herein by reference.

Referring to FIG. 3, an exemplary embodiment of analysis device 20 is shown. The depicted analysis device 20 includes a communications interface 32, processing circuitry 34, storage circuitry 36, and a light source 38. More, less or alternative components may be provided in other embodiments.

Communications interface 32 is configured to establish communications of analysis device 20 with respect to external devices. Exemplary configurations of communications interface 32 include a USB port, serial or parallel connection, IR interface, wireless interface, or any other arrangement capable of uni or bi-directional communications. Any appropriate data may be communicated using communications interface 32. For example, as described below, communications interface 32 may be utilized to communicate one or more emission characteristic (e.g., spectral power distributions) of light source 20 and/or one or more determined optical characteristics (e.g., responsivity function) of the respective imaging device 14 being analyzed.

In one embodiment, processing circuitry 34 may comprise circuitry configured to implement desired programming. For example, processing circuitry 34 may be implemented as a processor or other structure configured to execute executable instructions including, for example, software and/or firmware instructions. Other exemplary embodiments of processing circuitry include hardware logic, PGA, FPGA, ASIC, state machines, and/or other structures. These examples of processing circuitry 34 are for illustration and other configurations are possible.

Processing circuitry 34 may be utilized to control and/or monitor operations of analysis device 20, computer 22, and/or imaging device 14. In one embodiment, processing circuitry 34 is configured to automatically control the timing of emission of light from the device 20 (e.g., control the timing to simultaneously and/or sequentially emit light having different wavelengths and/or intensities from device 20). In one embodiment, processing circuitry 34 may automatically control the timing and the emission of the light without user intervention or input. According to additional illustrative aspects, processing circuitry 34 may control or providing timing to imaging device 14 and/or computer 22 for synchronizing image capture operations corresponding to the emitted light 16. In another embodiment, processing circuitry 34 is configured to receive and process commands received from externally of analysis device 20 (e.g., received from imaging device 14 and/or computer 22) to implement analysis operations.

Storage circuitry 36 is configured to store electronic data and/or programming such as executable instructions (e.g., software and/or firmware), or other digital information and may include processor-usable media. In one embodiment, storage circuitry 36 may store light source data indicative of light 16 emitted from analysis device 20. Exemplary light source data includes emission characteristics of light 16 emitted from analysis device 20. Exemplary emission characteristics may include spectral power distributions (SPDs) of light 16 emitted (e.g., generated or reflected) by the analysis device 20 according to one embodiment. Spectral power distributions include wavelengths of the emitted light 16 and associated intensities of the light 16 for the respective wavelengths.

Processor-usable media includes any article of manufacture which can contain, store, or maintain programming, data and/or digital information for use by or in connection with an instruction execution system including processing circuitry 34 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Light source 38 may be configured to emit light 16 of different wavelengths and/or intensities in one embodiment. The emitted light 16 of different wavelengths and/or intensities may be emitted simultaneously or sequentially in different illustrative exemplary embodiments. In but one embodiment, analysis device 20 is configured to emit light 16 of wavelengths: 395 nm, 430 nm, 450 nm, 470 nm, 490 nm, 505 nm, 530 nm, 560 nm, 590 nm, 605 nm, 630 nm, 650 nm, 670 nm, 700 nm, 720 nm, and white. In one implementation, the light source 38 may comprise a plurality of light emitting devices (e.g., light emitting diodes) which may be individually configured to emit narrow band light 16 of a respective wavelength and may be controlled to emit the respective light when appropriate. Additional details regarding exemplary configurations of light source 38 are described in the above-recited exemplary patent applications. In other embodiments, other light source 38 configurations may be used. For example, light from reflective patches may be used in one exemplary embodiment.

Although exemplary details are not shown, computer 22 of FIG. 2 may be configured similarly to analysis device 20 in one embodiment. More specifically, computer 22 may comprise a communications interface, processing circuitry, and storage circuitry similar to such above-described components in one embodiment. In addition, computer 22 may implement a user interface (e.g., display monitor and user input device) configured to interact with a user in one arrangement. In one embodiment, computer 22 may comprise additional components (e.g., arranged as a personal computer).

Referring to FIG. 4, imaging device 14 is illustrated in an exemplary configuration as a digital camera. As mentioned previously, imaging device 14 may be embodied in other configurations to generate images from scenes or received light. Imaging device in the illustrated configuration includes processing circuitry 40, storage circuitry 42, a strobe 44, an image sensor 46, optics 50, and a communications interface 52. Imaging device 14 may comprise more, less or other components in other embodiments.

In one embodiment, processing circuitry 40 may be embodied similar to processing circuitry 34 described above and comprise circuitry configured to implement desired programming. Processing circuitry 40 may include different and/or alternative hardware or components to control operations of imaging device 14 (e.g., control strobe 44, optics 50, data acquisition and storage, processing of image data, communications with external devices, and any other desired operations). These examples of processing circuitry 40 are for illustration and other configurations are possible. Processing circuitry 40 may additionally interface with analysis system 12 including issuing commands to analysis system 12 and/or receiving and processing commands received from analysis system 12. For example, issued commands may control analysis device 12 to emit light 16 and received commands may control imaging device 14 to capture received light 16, output image data (e.g., raw data) generated responsive to received light 16, or implement other desired operations for analysis of imaging device 14.

Storage circuitry 42 is configured to store electronic data (e.g., image data) and/or programming such as executable instructions (e.g., software and/or firmware), or other digital information and may include processor-usable media similar to the above-described storage circuitry 36 in at least one embodiment. Storage circuitry 42 may store responsivity functions corresponding to imaging device 14 and image data generated responsive to emitted light 16 in some examples.

Strobe 44 comprises a light source configured to provide light for usage in imaging of operations. Processing circuitry 40 controls operation of strobe 44 in the described embodiment. Strobe 44 may be disabled, or utilized alone or in conjunction with other external sources of light (not shown).

Image sensor 46 is configured to provide raw image data of a plurality of raw images. The raw image data comprises digital data corresponding to a plurality of pixels of the raw images formed by image sensor 46. For example, the raw images comprise bytes corresponding to one or more channel. In an exemplary RGB implementation, the channels may correspond to the colors of red, green and blue at respective pixels. Other embodiments may utilize or provide black and white or other color information. Image sensor 46 may comprise a plurality of photosensitive elements, such as photodiodes, corresponding to the pixels and configured to provide the raw digital data usable for generating images. Photosensitive elements may individually comprise charge coupled devices (CCDs) or CMOS devices in exemplary configurations.

In one embodiment, optics 50 includes an appropriate filter and/or lens configured to focus and/or direct received light 16 to image sensor 46.

Communications interface 52 is configured to establish communications of imaging device 14 with respect to external devices (e.g., analysis device 20 and/or computer 22). Exemplary configurations of communications interface 52 include a USB port, serial or parallel connection, IR interface, wireless interface, or any other arrangement capable of uni or bi-directional communications. Communications interface 52 may be configured to couple with and exchange any appropriate data and/or commands with analysis system 12. For example, communications interface 52 may be utilized to receive one or more command, emission characteristic of light 16 and/or one or more determined optical characteristic (e.g., responsivity function) of the respective imaging device 14. Further, interface 52 may output image data generated by image sensor 46 and which may be used to implement analysis operations including determination of optical characteristics of imaging device 14 in exemplary embodiments.

Other embodiments of analysis system 12 are possible. For example, computer 22 may be omitted in some arrangements, and if appropriate, analysis device 20 and/or imaging device 14 may implement functionality otherwise provided by computer 22. More specifically, if present, computer 22 may provide a user interface (not shown) including a display for depicting information for a user and an input device configured to receive input from a user. Computer 22 may additionally implement and/or control operations of analysis device 20 and/or imaging device 14 to enable analysis of the imaging device 14. For example, processing circuitry of computer 22 may synchronize light emissions of analysis device 20 and image capture operations of imaging device 14 to capture images of the emitted light 16. Processing circuitry of computer 22 may communicate and/or receive communications (e.g., data, commands, etc.) from analysis device 20 and/or imaging device 14. Processing circuitry may process received data, control the user interface to illustrate test results to a user, provide data for use in imaging device 14, and implement other desired aspects of the analysis system 12.

As mentioned above, the above-described functions of computer 22 may be implemented using analysis device 20 and/or imaging device 14 in arrangements wherein computer 22 is omitted. In embodiments wherein computer 22 is omitted, analysis device 20 and/or imaging device 14 may directly communicate with and/or control the other device, interface with a user and perform other desired functions and operations to enable analysis operations.

Referring to the U.S. patent application Ser. No. 10/818,622 incorporated by reference above, exemplary aspects for calculating an optical characteristic comprising a responsivity function of imaging device 14 are described. Exemplary embodiments described below provide additional exemplary details regarding calculation of one or more responsivity functions of imaging device 14. Other embodiments are possible.

Figure 5:
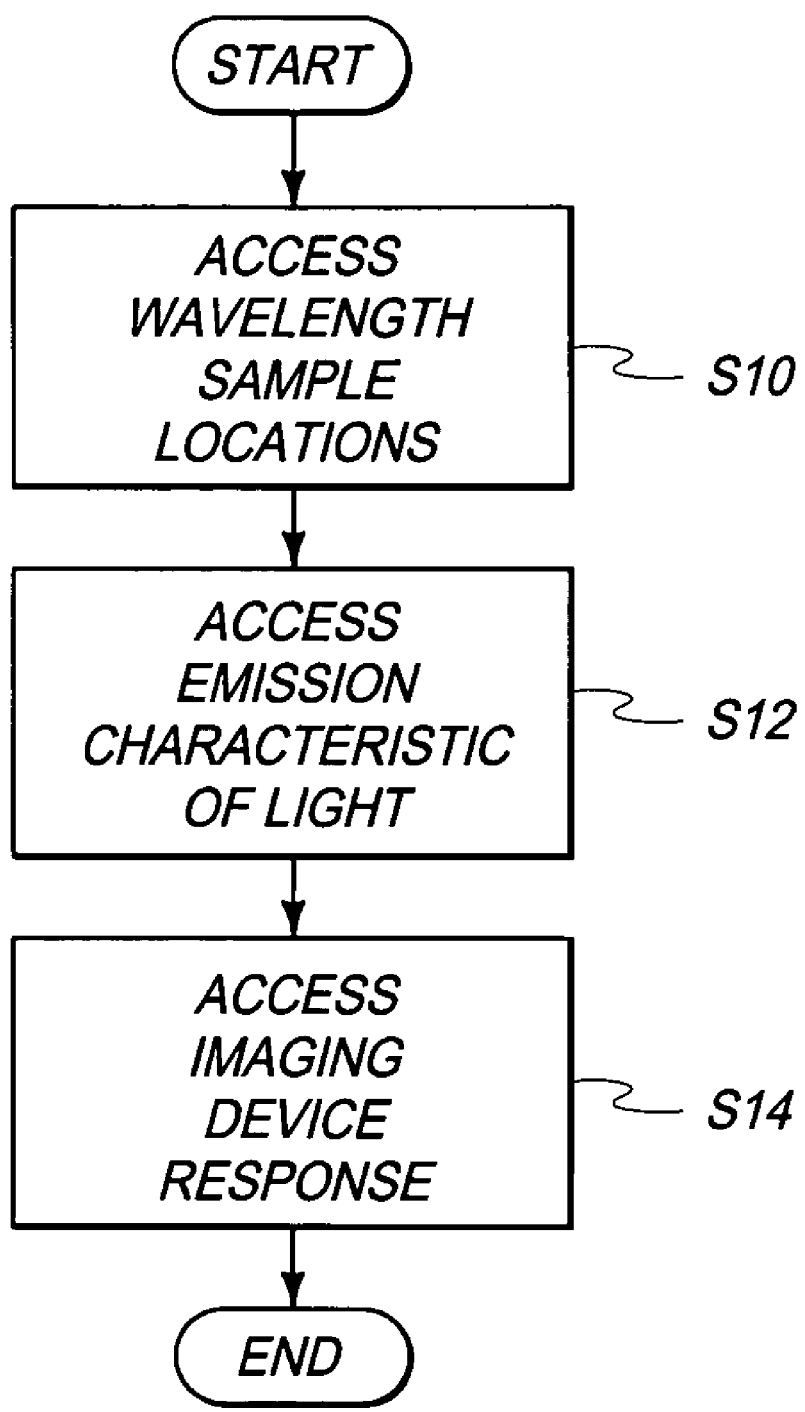
FIG. 5 is a flow chart of an exemplary method for providing inputs for analysis of responsivity of an imaging device according to one embodiment.
Figure 6:
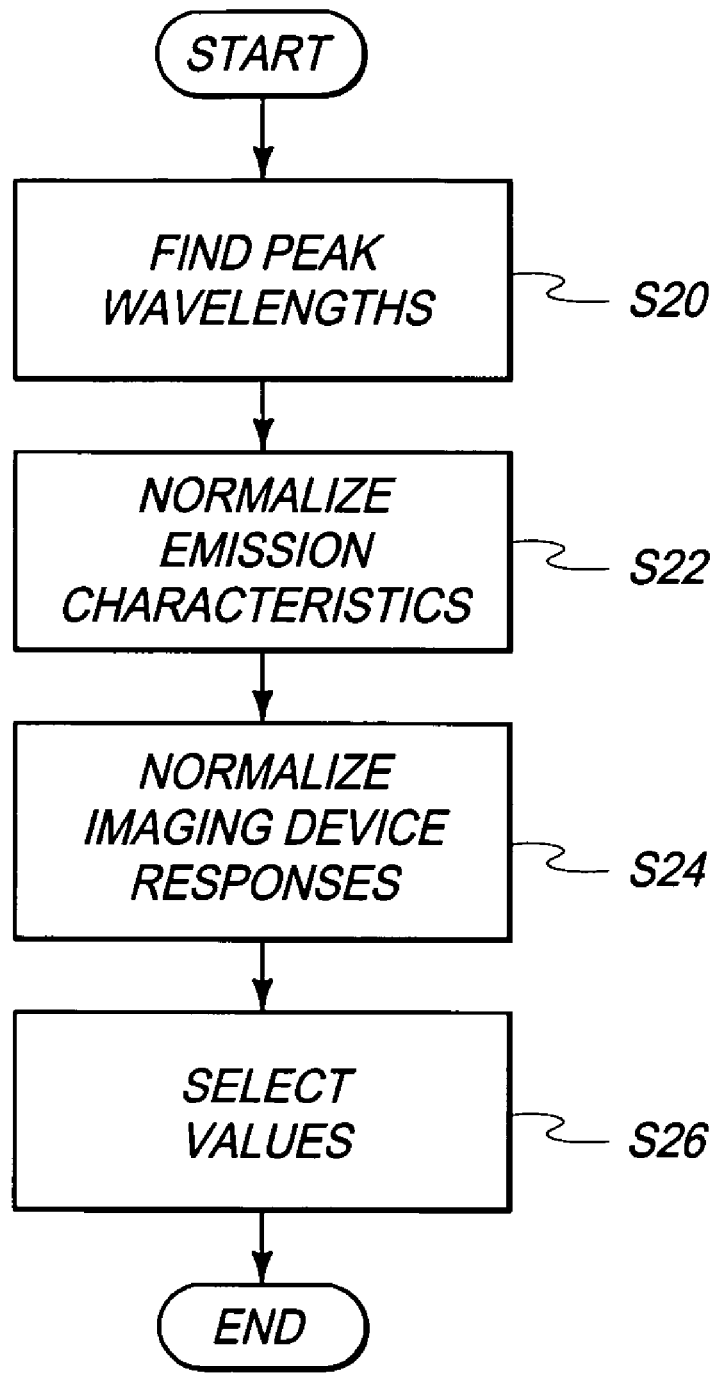
FIG. 6 is a flow chart of an exemplary method for preparing for analysis of responsivity of an imaging device according to one embodiment.
Figure 7:
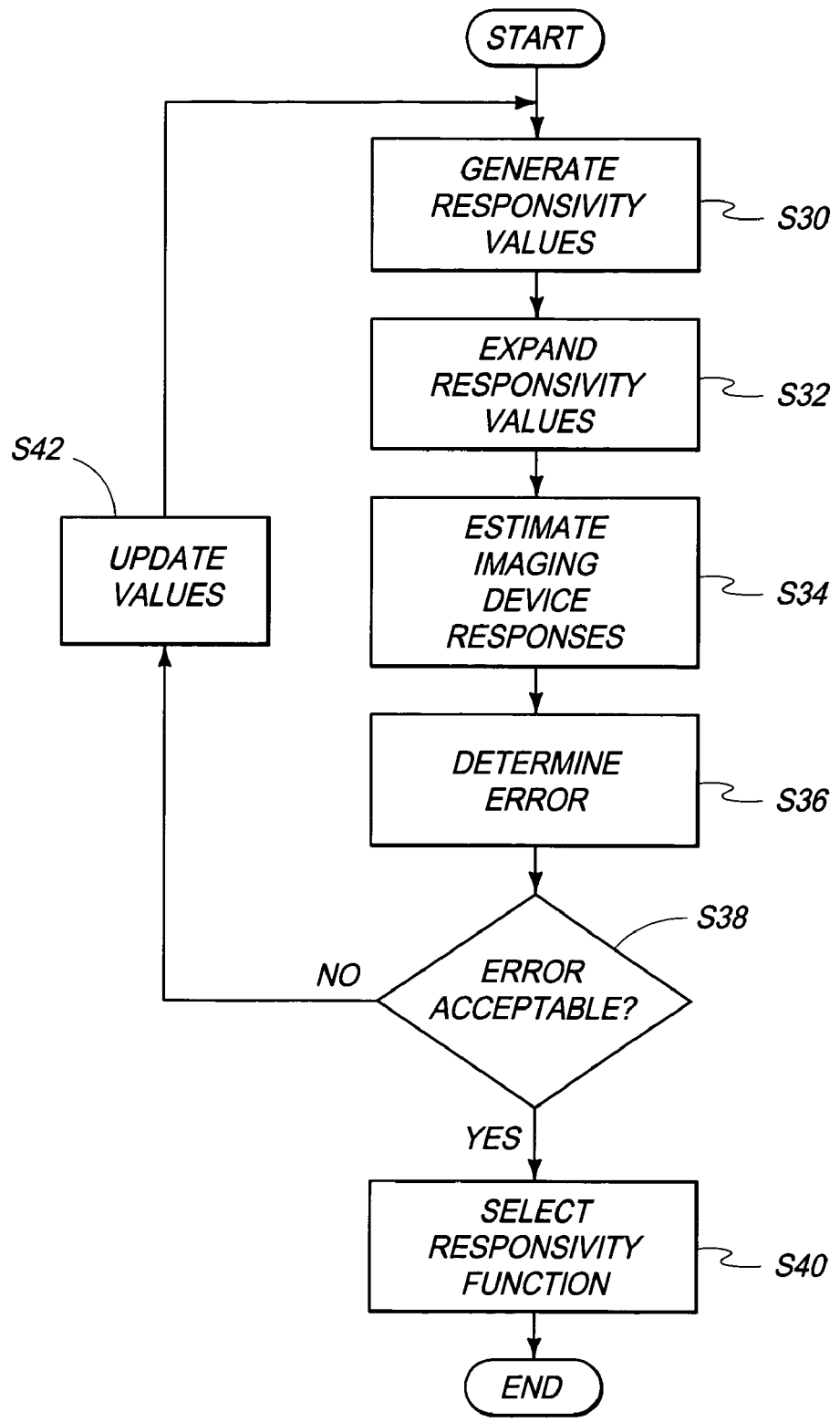
FIG. 7 is a flow chart of an exemplary method for determining a responsivity function of an imaging device according to one embodiment.

Referring to FIGS. 5-7, exemplary methods are described for determining responsivity functions of imaging devices 14 according to possible embodiments. The described methods may be implemented using one or more of analysis device 20, computer 22, and/or imaging device 14. Processing circuitry of respective devices 20, 22 and/or 14 may implement one or more of the disclosed steps of the exemplary methods in various arrangements. Other methods are possible including more, less and/or alternative steps.

Referring to FIG. 5, an exemplary method describes data which may be inputted for calculation of a responsivity function of imaging device 14.

At a first step S10, the appropriate processing circuitry accesses wavelength sample locations. This information specifies the wavelengths wherein information is available for emitted light 16. For example, the wavelength sample locations may be provided by an analysis instrument configured to provide the data of step S12 which may be stored within storage circuitry of analysis device 20 in one embodiment. The wavelength sample locations ($w_s$) may be represented by the below matrix wherein sample locations are provided every 4 nm in the range of 380-780 nm in one embodiment and $N_{wave}$ corresponds to the number of wavelength samples:

$$W_S = \begin{bmatrix} 380 \\ 384 \\ 388 \\ 392 \\ 396 \\ 400 \\ 404 \\ \ldots \\ 780 \end{bmatrix}$$

$N_{wave} \times 1$

Figure 9:
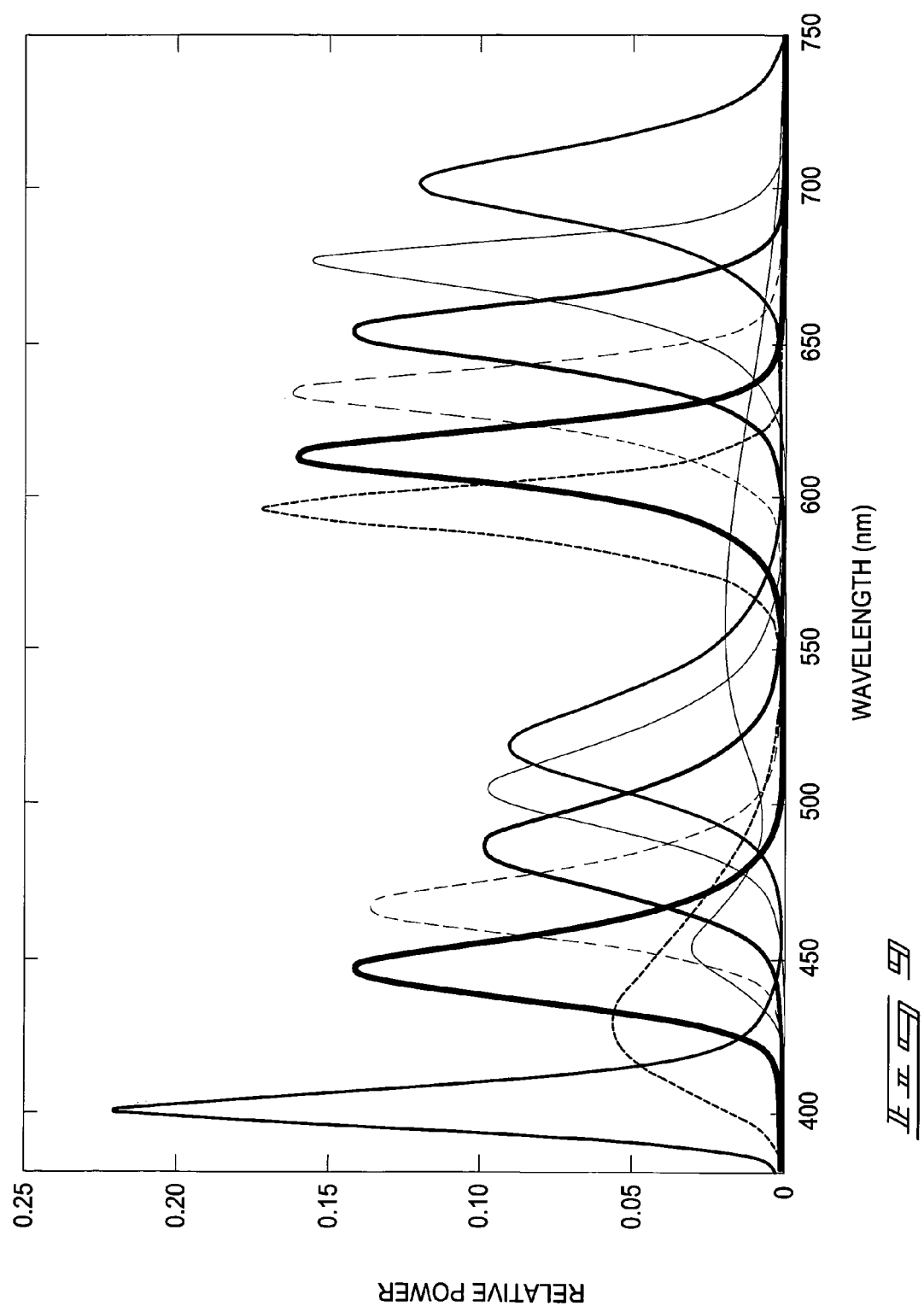
FIG. 9 is a graphical representation of spectral power distributions of different wavelengths of light provided by an analysis device according to one embodiment.

At a step S12, the appropriate processing circuitry accesses emission characteristics of light emitted from the analysis device. In one embodiment, the emission characteristics include spectral power distributions of the different wavelengths of light. For example, in embodiments wherein a plurality of light emitting devices are used, the emission characteristics may comprise spectral power distributions of respective ones of the light emitting devices. The emission characteristics (S) may be stored within storage circuitry of the analysis device in one embodiment. Exemplary spectral power distributions of light emitting devices are shown in FIG. 9 in one embodiment. The emission characteristics may be represented by the below matrix wherein $N_{SPD}$ corresponds to the number of different spectral power distributions (SPDs) of light being provided by the light source:

$$S = \begin{bmatrix} LED\#1 SPD \\ LED\#2 SPD \\ LED\#3 SPD \\ \ldots \\ LED\#N_{SPD} \\ SPD \end{bmatrix}$$

$N_{wave} \times N_{SPD}$

At a step S14, the processing circuitry may access response data of the imaging device. In one embodiment, the response data includes a measured imaging device response generated responsive to the reception of the light having different spectral power distributions from the light source of the analysis device. The response may be determined by emitting light from analysis device and capturing the light to generate image data of the measured imaging device response. The measured imaging device response (r) may be represented by the below matrix wherein $N_{sens}$ corresponds to the number of channels (e.g., RGB) sensed by the image sensor of the imaging device:

$$r = \begin{bmatrix} Resp\#1 \\ Resp\#2 \\ Resp\#3 \\ \ldots \\ Resp\#N_{SPD} \end{bmatrix}$$

$N_{sens} \times N_{SPD}$

Referring to FIG. 6, a method is shown for preparing the analysis to determine the responsivity function(s) of the imaging device 14.

At a step S20, peak wavelengths may be determined from the spectral power distributions for each of the light emitting devices (i.e., except for white in one embodiment) for embodiments wherein narrowband light sources are used. The peak wavelengths may be determined by $w_p$=wavelength$\{max_{col}(S)\}$ in one embodiment wherein $max_{col}$ is the maximum along each matrix column. The peak wavelengths (e.g., see FIG. 9) in one example may be represented by the following matrix:

$$W_p = \begin{bmatrix} 395 \\ 420 \\ 450 \\ \ldots \\ 720 \end{bmatrix}$$

$N_{SPD} \times 1$

In embodiments wherein broadband light is used, the wavelengths corresponding to responsivity coefficients to be determined may be evenly spaced across the spectrum of interest.

At a step S22, the spectral power distributions may be normalized in one embodiment by the maximum spectral power distribution energy according to $S=S/max(1^T S)$ wherein max is the maximum for the entire matrix or vector, 1 is a vector of 1 s, T is the matrix transpose and max ($1^T S$) results in a scalar value.

At a step S24, the measured responses for the imaging device for each of the spectral power distributions of emitted light may be normalized to be less than one according to r=r/max(r) in one embodiment wherein max (r) results in a scalar value.

At a step S26, values (N) are selected as starting points for each of the peak wavelengths $w_p$ and for each channel of the imaging device. Accordingly, if the image sensor of the imaging device includes three channels (e.g., RGB), and sixteen wavelengths (e.g., including white) are emitted by the analysis device, values N may include forty-eight numbers (16×3). The values may be randomly generated and comprise negative values in one embodiment. In one embodiment, the random generation of negative numbers assists with convergence during subsequent processing. The values N may be represented by the following matrix:

$$N = \begin{bmatrix} -Rand\#1 \\ -Rand\#2 \\ \ldots \\ -Rand\#N_{sens} \end{bmatrix}$$

$$N_{SPD} \times N_{sens}$$

Referring to FIG. 7, an exemplary method is shown for calculating one or more responsivity functions of imaging device 14 following the execution of the methods of FIGS. 5-6. A plurality of predictive responsivity functions may be calculated as being representative of responsivity of the imaging device and have associated error as described below. When values of the predictive responsivity functions are found to have acceptable error, the values may be selected as the responsivity function(s) to be used by the respective imaging device being analyzed according to one embodiment.

At a step S30, the appropriate processing circuitry generates responsivity values ($R_p$) comprising responsivity coefficients of the same sign (e.g., including zero or positive) in one embodiment. In one embodiment, the values N may be used to determine the responsivity values according to the following exemplary formula $R_p$=exp(N) which constrains the values to comprise positive values. The responsivity values $R_p$ correspond to respective $w_p$ values determined in step S20.

Figure 8:
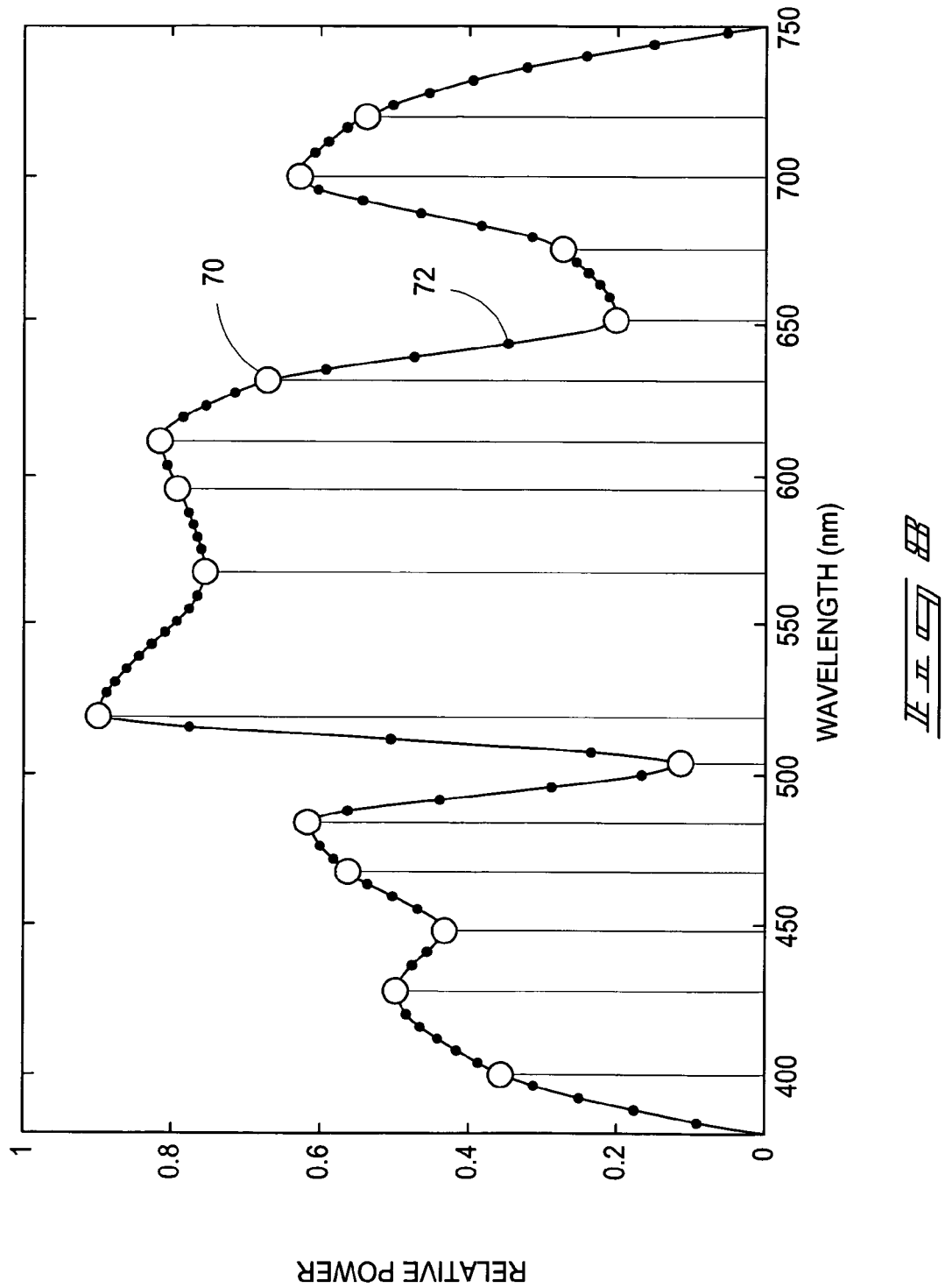
FIG. 8 is a graphical representation of exemplary interpolation operations according to one embodiment.

At a step S32, the processing circuitry may expand the responsivity values of step S30 to provide additional responsivity values for each of the respective channels. In one embodiment, the processing circuitry may interpolate the $R_p$ values located at positions $w_p$ to the $w_s$ sample locations to provide additional responsivity values $R_s$ for a first predictive responsivity function or plural first predictive responsivity functions if the imaging device comprises plural channels. According to one embodiment, a shape preserving interpolation routine may be used to prevent overshoots or undershoots and maintain and provide the responsivity values as positive values. For example, a Piece-wise Cubic Hermite Interpolating Polynomial (PCHIP) interpolation routine may be implemented in one exemplary configuration. An exemplary graph of responsivity of one channel is shown in FIG. 8 wherein $R_p$ values are represented by points 70 and expanded $R_s$ values are represented by points 72. For points 70, the x values=$w_p$ values and the y values=$R_p$ values, and for points 72, the x values=$w_s$ values and the y values=$R_s$ values. Although not shown, other graphs may be provided for the other channels of the imaging device using the respective $R_p$ and $R_s$ values corresponding to the other channels.

At a step S34, the processing circuitry may use the responsivity values $R_s$ to estimate the imaging device responses ($r_e$) for the spectra of each of the light emitting devices according to the formula $r_e = R_s^T S$.

At a step S36, the processing circuitry determines error using the estimated responses ($r_e$) and the measured responses (r). According to one embodiment, the processing circuitry calculates the error ($\delta$) according to the formula $\delta = \text{sum}\{(r_e-r)^2\}$ wherein sum is the summation over the entire matrix or vector in the described embodiment.

At a step S38, the processing circuitry determines whether the calculated error is acceptable. For example, the error is indicative of the accuracy of the predictive responsivity function(s) with respect to the actual responsivity of the channel(s) of the imaging device at the moment in time when the response of the imaging device is measured. The error may be compared with a threshold in one embodiment to determine whether the error is acceptable (e.g., below a threshold such as 1% is acceptable in one implementation).

If the condition of step S38 is affirmative, the responsivity function(s) of the imaging device are set using the responsivity values $R_s$ at a step S40 in one embodiment.

If the condition of step S38 is negative, a step S42 is performed wherein the values N are updated using the calculated error. In one embodiment, the values are updated using a nonlinear optimization routine (e.g., Levenberg-Marquardt optimization routine in one implementation). In one embodiment, the nonlinear optimization routine may be constrained to yield all values N comprising positive values which avoids modification (e.g., clipping of negative values). In such an embodiment wherein the routine is constrained, the resultant positive values N may be set to equal the responsivity values $R_p$ and the process may return to step S32 for expansion. Otherwise, if the optimization routine is not constrained, the outputted values of the routine may be provided to step S30 for modification as described above.

The method may be repeated until the responsivity values $R_s$ provide acceptable error at step S38. The respective responsivity values $R_p$ and/or $R_s$ may be selected as the responsivity function(s) at step S40. In one embodiment, the responsivity values $R_s$ and responsivity function(s) providing minimal error compared with others of the predictive responsivity functions comprising positive coefficients is selected. Once selected, the selected responsivity function(s) may be used by the imaging device 14 for implementing imaging operations. For example, the determined responsivity function(s) may be used to calculate a color correction matrix and/or modify illuminant estimation operations of imaging device 14. In the future, the response of the image sensor 46 of imaging device 14 may change and it may be desired to again perform the exemplary processing described herein to provide one or more updated responsivity function(s) for the imaging device 14 at a future moment in time.

Referring to FIG. 9, an exemplary graph of spectral power distributions of a plurality of light emitting devices which comprise light source 38 are shown for implementing exemplary analysis operations herein. Other embodiments including other light source configurations are possible.

According to at least some of the described embodiments, analysis methods and apparatus are configured to determine one or more responsivity function(s) of an imaging device being analyzed. At least one embodiment provides determination of the responsivity function(s) comprising values of the same sign. The determination according to the exemplary embodiment enables calculation of the responsivity function(s) without clipping determined values (e.g., negative values) of the determined responsivity function(s). Accordingly, in at least one embodiment, the responsivity function(s) having all non-negative values and reduced or minimal associated error compared with other predictive responsivity functions comprising non-negative values may be determined.

The protection sought is not to be limited to the disclosed embodiments, which are given by way of example only, but instead is to be limited only by the scope of the appended claims.

What is claimed is:

1. An imaging device analysis method comprising:
providing a plurality of first responsivity values corresponding to a first responsivity function of an imaging device;
first determining that error associated with the first responsivity values is unacceptable;
providing a plurality of second responsivity values corresponding to a second responsivity function of the imaging device as a result of the first determining, wherein the providing the second responsivity values comprises constraining the second responsivity values to comprise values of the same sign;
second determining error associated with the second responsivity values; and
selecting the second responsivity values as a result of the second determining yielding acceptable error.

2. The method of claim 1 wherein the providing the first responsivity values comprises constraining all of the first responsivity values to comprise values of the same sign.

3. The method of claim 1 wherein the first and the second determinings individually comprise:
estimating a response of the imaging device using the respective ones of the first and the second responsivity values; and
comparing the response with a measured response of the imaging device to provide the error.

4. The method of claim 1 wherein the selecting comprises selecting the second responsivity values as the responsivity function of the imaging device.

5. The method of claim 1 wherein the selecting comprises selecting the second responsivity values corresponding to a plurality of second responsivity functions for respective channels of the imaging device.

6. The method of claim 1 wherein the providing the second responsivity values comprises executing an optimization routine to provide the second responsivity values.

7. The method of claim 6 wherein the second responsivity values comprise the output of the optimization routine without modification.

8. The method of claim 1 wherein the second determining comprises determining the error comprising a minimal value with the second responsivity values comprising values of the same sign.

9. The method of claim 1 wherein the selecting comprises selecting the second responsivity values as the responsivity function of the imaging device.

10. The method of claim 1 wherein the providing the first responsivity values and the providing the second responsivity values individually comprise providing independent of reception of light by the imaging device.

11. The method of claim 1 further comprising first determining the error associated with the first responsivity values using a response of the imaging device to received light and second determining the error associated with the second responsivity values using the response of the imaging device to received light.

12. An imaging device analysis system comprising:
processing circuitry configured to generate a plurality of first responsivity values corresponding to a first predictive responsivity function of an imaging device, to calculate a first error value using the first responsivity values and image data generated by the imaging device responsive to received light, to identify a plurality of second responsivity values corresponding to a second predictive responsivity function of the imaging device as a result of the first error value being unacceptable, to calculate a second error value using the second responsivity values and the image data, and to select the second responsivity values and the second predictive responsivity function as the responsivity function for the imaging device as a result of the second error value being acceptable.

13. The system of claim 12 wherein all responsivity values of the first predictive responsivity function comprise values of the same sign.

14. The system of claim 12 wherein all responsivity values of the second predictive responsivity function comprise values of the same sign.

15. The system of claim 12 wherein the second responsivity values comprise values for a plurality of second predictive responsivity functions for respective channels of the imaging device, and wherein the selection comprises selection of the plural second predictive responsivity functions for the respective channels of the imaging device.

16. The system of claim 12 wherein the processing circuitry is configured to access the image data comprising a measured response, to generate plural respective estimated responses using respective ones of the first predictive responsivity function and the second predictive responsivity function, and to compare the measured response with individual ones of the plural estimated responses to calculate respective ones of the first error value and the second error value.

17. The system of claim 12 wherein the processing circuitry is configured to identify the second responsivity values without clipping.

18. The system of claim 12 wherein the processing circuitry is constrained to identify only values of the same sign as responsivity values for all predictive responsivity functions.

19. The system of claim 12 wherein the processing circuitry is configured to execute an optimization routine to identify the second responsivity values.

20. The system of claim 19 wherein the output of the optimization routine comprises the second responsivity values without modification.

21. The system of claim 12 wherein the processing circuitry is configured to select the second predictive responsivity function as a result of the second error value comprising a minimal error value for the predictive responsivity functions comprising the responsivity values of the same sign.

22. The system of claim 12 wherein the processing circuitry comprises processing circuitry of the imaging device.

23. The system of claim 12 wherein the processing circuitry is constrained to generate and to identify all of the first and second responsivity values to comprise values having the same sign.

24. The system of claim 12 wherein the processing circuitry is configured to generate the first responsivity values independent of reception of light by the imaging device and to identify the second responsivity values independent of reception of light by the imaging device.

25. The system of claim 24 wherein the processing circuitry is configured to compare individual ones of the first responsivity values and the second responsivity values to a response of the imaging device to received light to calculate respective ones of the first error value and the second error value.

26. An imaging device analysis system comprising:
processing circuitry configured to identify a plurality of predictive responsivity functions individually indicative of responsivity of an imaging device to received light, wherein individual ones of the predictive responsivity functions comprise a plurality of responsivity values, wherein the processing circuitry is constrained to identify the predictive responsivity functions individually comprising all respective responsivity values of the same sign, and wherein the processing circuitry is configured to select one of the predictive responsivity functions as a responsivity function to be used by the imaging device using data regarding a light source and data regarding a response of the imaging device to the light of the light source.

27. The system of claim 26 wherein the processing circuitry is configured to determine associated error for respective ones of the predictive responsivity functions and to select the one of the predictive responsivity functions having minimal associated error of the plural predictive responsivity functions comprising the responsivity values of the same sign.

28. An imaging device analysis system comprising:
means for accessing a plurality of initial responsivity values predictive of responsivity of an imaging device;
means for identifying other responsivity values predictive of the responsivity of the imaging device after the initial responsivity values have been accessed;
means for constraining the other responsivity values to comprise values of the same sign before the identification of the other responsivity values; and
means for selecting the other responsivity values to comprise a responsivity function of the imaging device.

29. The system of claim 28 further comprising means for constraining the initial responsivity values to comprise values of the same sign.

30. The system of claim 28 wherein the means for identifying comprises means for executing an optimization routine, and the other responsivity values comprise values outputted from the optimization routine without modification.

31. The system of claim 28 wherein the means for identifying and the means for constraining comprise means for executing an optimization routine constrained to only identify non-negative responsivity values.

32. The system of claim 28 wherein the means for constraining comprises means for constraining without clipping.

33. The system of claim 28 further comprising:
means for estimating an estimated response of the imaging device using the other responsivity values;
means for comparing the estimated response with a measured response of the imaging device for determining error; and
wherein the means for selecting comprises means for selecting the other responsivity values as a result of the determination of the error.

34. The system of claim 33 wherein the means for selecting comprises means for selecting as a result of the error comprising minimal error for all responsivity values comprising values of the same sign.

35. An article of manufacture comprising:
a non-transitory, tangible, computer-readable storage medium configured to store computer program instructions configured to cause processing circuitry to perform processing comprising:
providing an initial predictive responsivity function of an imaging device;
first determining an estimated response of the imaging device using the initial predictive responsivity function;
second determining an accuracy of the estimated response of the imaging device;
as a result of the second determining, searching to identify another predictive responsivity function; and
constraining the searching to other predictive responsivity functions individually comprising all responsivity values of the same sign.

36. The article of claim 35 wherein the programming is configured to cause processing circuitry to perform processing comprising constraining the initial predictive responsivity function to only comprise responsivity values of the same sign.

37. The article of claim 35 wherein the second determining comprises comparing the estimated response with a measured response of the imaging device to determine error.

38. The article of claim 35 wherein the programming is configured to cause processing circuitry to perform processing comprising determining error associated with the other predictive responsivity functions and selecting the another predictive responsivity function as a result of the another predictive responsivity function having minimal error of the other predictive responsibility functions individually comprising all responsivity values of the same sign.

* * * * *